United States Patent Office 3,832,350
Patented Aug. 27, 1974

3,832,350
METHOD FOR THE MANUFACTURE OF A DECOLORIZED DERIVATIVE OF BENZOPYRYLIUM SALT
Shoji Maruyama, Tomio Kubota, Katue Kojima, and Hiroshi Tamura, Tokyo, Japan, assignors to Ricoh Co., Ltd., Tokyo, Japan
Filed Dec. 23, 1971, Ser. No. 211,419
Claims priority, application Japan, Dec. 26, 1970, 45/129,623
Int. Cl. C07d 7/32
U.S. Cl. 260—240 D       3 Claims

ABSTRACT OF THE DISCLOSURE

A method for the preparation of a decolorized derivative having the formula (I)

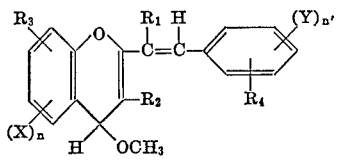

where X is halogen, nitro or nitrile group; Y is halogen, nitro, nitrile or carboxyl group; $R_1$ is hydrogen or alkyl group having 1–4 carbon atoms; $R_2$ is hydrogen or phenyl group $R_3$ and $R_4$ are hydrogen, alkyl group having 1–2 carbon atoms, or methoxyl group; $n$ and $n'$ ar 0, 1 or 2, but at least one of $n$ and $n'$ is not zero, wherein a benzopyrylium salt is heated in a mixed solvent of methanol-benzene containing alkali, and the solution is then concentrated and poured into a mixture of crushed ice water.

BACKGROUND OF THE INVENTION (a) Field of the invention

The present invention relates to the method for the manufacture of a decolorized derivative of benzopyrylium salt having an excellent photosensitivity for an organic photoconductor.

(b) Description of the prior art

When the decolorized derivative of a benzopyrylium salt having the chemical structure expressed by the aforementioned formula (I) is reacted with various kinds of benzopyrylium salts into complex dyes, these dyes give an excellent sensitivity to the photoconductive substance, particularly to the organic photoconductors when used therein.

It has been well known that a benzopyrylium salt, when placed in a solution of methanol containing alkali, reacts with said methanol; however, for heating a benzopyrylium salt, whose chemical structure is expressed by the undermentioned formula (II), having at least one electron attractive group in

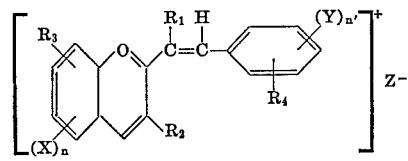

where X, Y, $R_1$, $R_2$, $R_3$, $R_4$, $n$ and $n'$ are the same groups and numbers are X, Y, $R_1$, $R_2$, $R_3$, $R_4$, $n$ and $n'$ in the formula (I), and Z⁻ is anion functional group;

its molecules, in methanol containing sodium hydrogencarbonate, it is necessary to use about 1 l. or more of methanol per 10 g. of said benzopyrylium salt and this fact requires the use of a reactor of large capacity. Further, many difficulties are found in separating the reaction product from the reaction solvent and also in the means of obtaining the desired product matter.

SUMMARY OF THE INVENTION

The present invention is based on the findings and knowledge obtained from the investigations and researches made with the object of achieving the method whereby the reaction can be conducted prefectly between the benzopyrylium salt whose chemical structure is expressed by the aforementioned formula (II) methanol in the solvent of small quantity and also of eliminating many existing difficulties.

The object of the present invention is to provide an extremely simplified method for the preparation of the decolorized derivative, whose chemical structure is expressed by the formula (I), which is useful as an intermediate material of the sensitizer for electrophotographic copying materials.

This invention is a method for the preparation of a decolorized derivative characterized by obtaining the decolorized derivative having the formula (I)

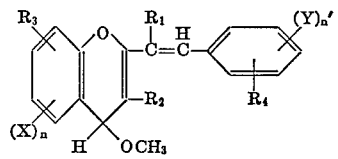

where X is halogen, nitro or nitrile group; Y is halogen, nitro, nitrile or carboxyl group; $R_1$ is hydrogen or alkyl group having 1–4 carbon atoms; $R_2$ is hydrogen or phenyl group; $R_3$ and $R_4$ are hydrogen, alkyl group having 1–2 carbon atoms, or methoxyl group; $n$ and $n'$ are 0, 1 or 2, but at least one of $n$ and $n'$ is not zero;

wherein a benzopyrylium salt having at least one electron attractive group in a molecular, represented by the formula (II)

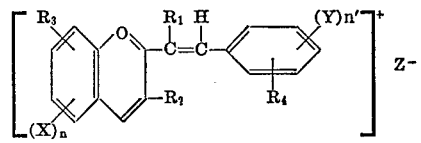

where X, Y, $R_1$, $R_2$, $R_3$, $R_4$, $n$ and $n'$ are the same groups and numbers are X, Y, $R_1$, $R_2$, $R_3$, $R_4$, $n$ and $n'$ in the formula (I), and Z⁻ is anion functional group;

is heated in a mixed solvent of methanol-benzene containing alkali, and th solution is then concentrated and poured into the mixture of crushed ice water to separate the crystalline product.

The benzopyrylium salt having the formula (II) is prepared by making the substituted 2-hydroxybenzaldehyde having the formula (II'):

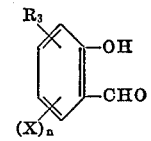

where $R_3$, X and $n$ are the same groups and the number as $R_3$, X and $n$ in the formula (I), react with an aceton derivative having the formula (III)

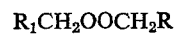

$R_1CH_2OOCH_2R$ where $R_1$ and $R_2$ are the same groups as $R_1$ and $R_2$ in the formula (I), in the acid reaction solvent at −10–30° C., or more preferably at a room temperature, and further letting the preceding reaction product react in the same reaction system with aldehyde having the formula (IV)

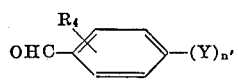

where $R_4$, $Y$ and $n'$ are the same groups and the number as $R_4$, $Y$ and $n'$ in the formula (I), and then by adding in succession to the preceding procedure an acid having the desired anion functional group to the same reaction system for another reaction. Of the aforementioned series of reactions, the reaction which takes place between the compounds having respectively the formulas (II') and (III) forms an aldehyde acetone derivative having the following resonance structure with the formula (V)

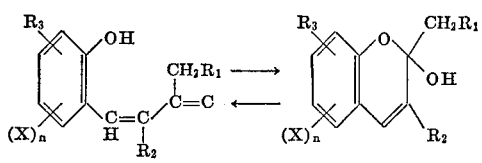

where $R_1$, $R_2$, $R_3$, $X$ and $n$ are the same groups and the number as $R_1$, $R_2$, $R_3$, $X$ and $n$ in the formula (I). By adding aldehyde having the formula (IV) to the previous product, a condensation cyclic reaction may be promoted. As for the mineral acid, hydrochloric acid is used; and for the solvent, such organic acid like formic acid, acetic acid, etc. are used. The quantity of the mineral acid to be added in this reaction is deemed to be proper when set between 2 and 6 moles.

This obtained benzopyrylium salt is then dissolved in the mixed solvent consisting of methanol which contains alkali and benzene. After heating the solution, it is subjected to concentration, and the product thus concentrated is poured into the crushed ice and water to separate the decolorized derivative whose chemical structure is expressed by the formula (I).

Incidentally, as for the composition of the mixed solvent which is used in this reaction, the mixed solution comprises benzene ranging from 85 to 340 parts by volume, or more preferably ranging from 170 to 255 parts by volume, per 100 parts by volume of methanol which contains alkali in it, and adding temperature is 70–100° C., or more preferably 80–90° C.

More particularly, according to the present invention, the quantity of the solvent is reduced to approximately ⅕—approximately ⅒ or less by use of the aforementioned mixed solvent as compared with the use of the reaction solvent simply comprising methanol alone. Further, the separation of inorganic compounds contained in the benzopyrylium salt by means of elution in the step where the aforementioned concentrated product is poured into the ice water allows the use of an extremely simplified reaction device to obtain the desired product. Incidentally, not only sodium hydrogencarbonate but also sodium carbonate can be used as an alkali which is to be made present in the reaction solvent according to the present invention.

DESCRIPTION OF THE PREFERRED EMBODIMENTS

Example 1

Synthesis of 2-p-methoxystyryl-3-phenyl-4-methoxy-6-chloro-1.4-benzopyran having the formula:

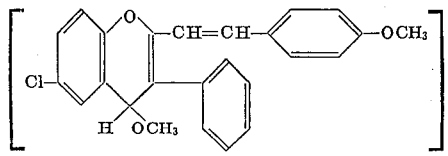

10.8 g. of 2-p-methoxystyryl - 3 - phenyl-6-chlorobenzopyrylium perchlorate having the formula

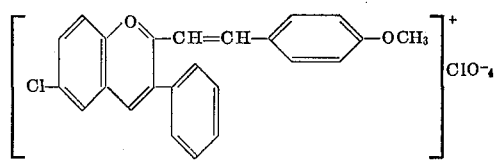

and 15 g. of sodium hydrogencarbonate were admixed with 50 ml. of methanol and 100 ml. of benzene and the whole mixture was heated for about one hour, during which time the reaction substance turned its color from purple to yellow. After the reaction matter was cooled, it was subjected to the filtration by means of suction. The filtrated liquid was concentrated under decreased pressure. The residue was dissolved and extracted by means of methanol and was then poured into the mixture of crushed ice and water to separate the desired crystalline product of a light yellow color, which was then filtrated by means of suction and was dried under decreased pressure after having been washed sufficiently with water. The crystal thus obtained had the melting point of 74–76° C. The results of its elemental analysis were as follows:

theoretical values: H, 5.19%; C, 74.41%; Cl, 8.78%.
experimental values: H, 5.32%; C, 74.56%; Cl, 8.50%.

Its absorption maximum wave length ($\lambda$ max.) measured by use of dichloroethane showed 420 m$\mu$ and the molar extinction coefficient was found to be $3.47 \times 10^4$. In the aforementioned preparation, the desired product was obtained almost quantitatively.

Example 2

Synthesis of 2-p-chlorostyryl-3-phenyl-4-methoxy-1.4-benzopyran having the formula:

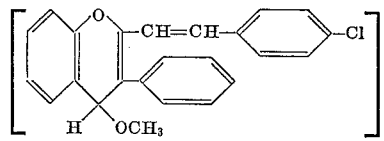

10 g. of 2-p-chlorostyryl-3-phenylbenzopyrylium perchlorate,

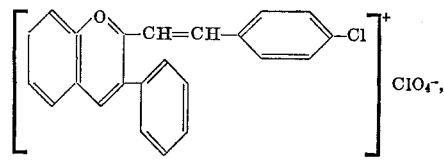

and 15 g. of sodium carbonate was added to 50 ml. of methanol and 100 ml. of benzene and the mixture was heated for about one hour. The resultant was cooled and filtrated by means of suction. The filtrate was concentrated under decreased pressure. The residue was dissolved and extracted with the use of methanol and was poured in the mixture of crushed ice and water, from which the crystal of a light yellow color was separated. It was filtrated by means of suction, washed thoroughly, and dried under decreased pressure to obtain 7.5 g. of the desired product.

The melting point of the crystal thus obtained was 70.5° C. The results of elemental analysis conducted on the product were as follows:

theoretical values: H, 5.07%; C, 76.90%; Cl, 9.48%.
experimental values: H, 5.21%; C, 76.83%; Cl, 9.67%.

The absorption maximum wave length ($\lambda$ max.) measured with the product dissolved in dichloroethane showed 310 m$\mu$ and the molar extinction coefficient was $1.02 \times 10^4$.

Figure 1:
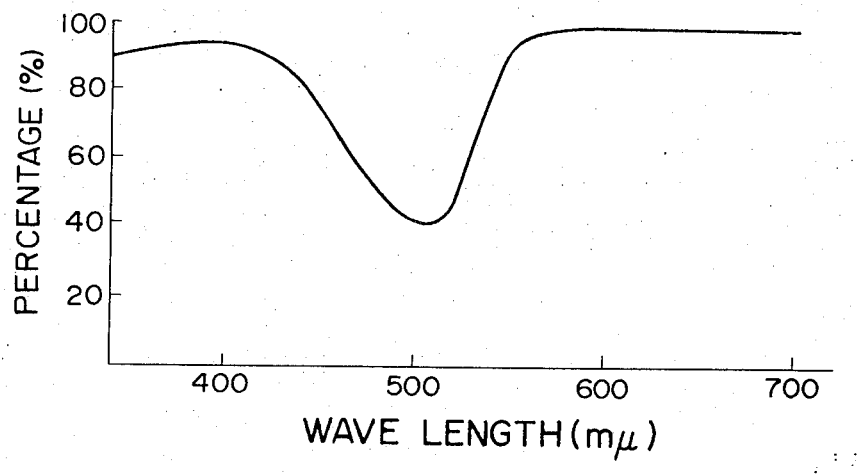
FIG. 1 and FIG. 2 represent curves to show the spectroscope absorption spectrums in the visible light region and ultraviolet region obtained with the materials used in the present invention.
Figure 2:
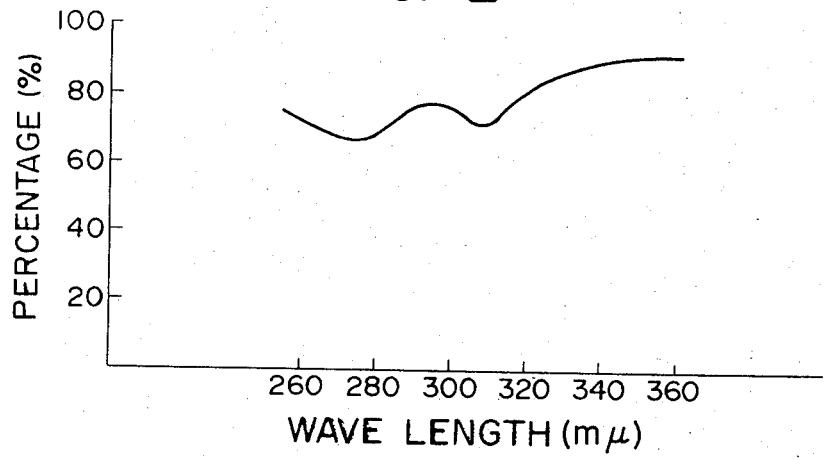
Figure 3:
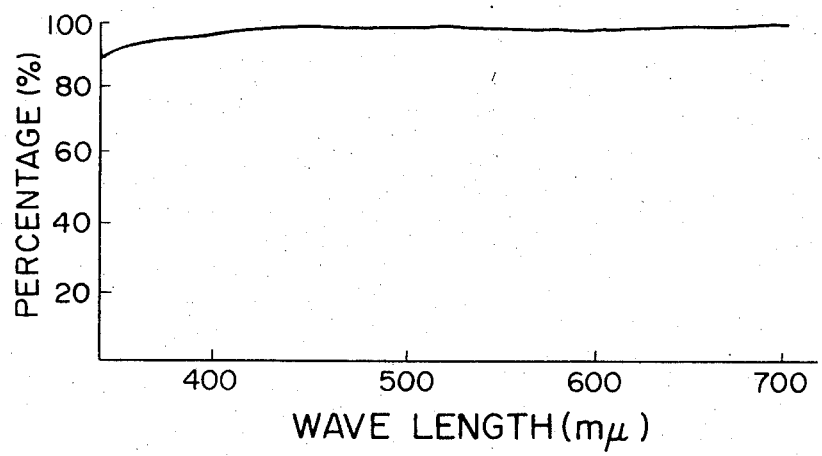
FIG. 3 and FIG. 4 represent curves to show the spectroscope absorption spectrums in the visible light region and ultraviolet region obtained with the decolorized derivatives prepared according to the present invention.
Figure 4:
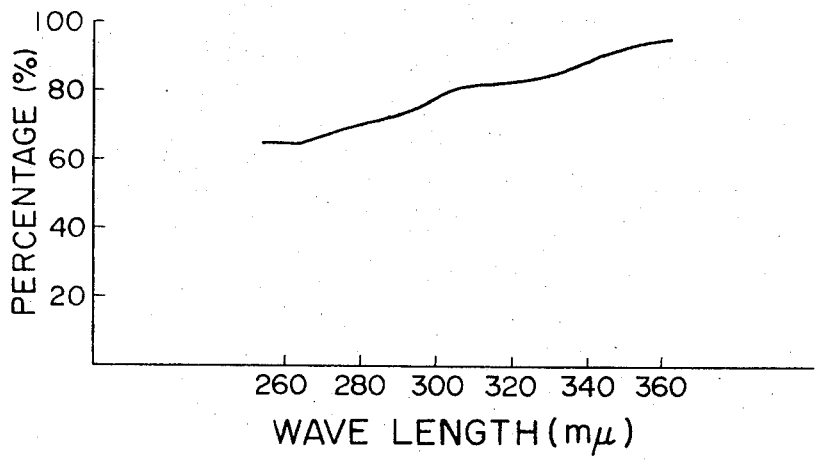

Attached FIG. 1 shows the spectroscope absorption spectrums in the visible light region obtained with the materials in the Examples, and FIG. 2 likewise shows the spectroscope absorption spectrums in the ultraviolet region. FIG. 3 shows the spectroscope absorption spectrums in the visible light region obtained with the products prepared in the Examples, and FIG. 4 likewise shows the spectroscope absorption spectrums in the ultraviolet region.

Example 3

Synthesis of 2-p-bromstyryl - 3 - phenyl-4-methoxy-6-chloro-1.4-benzopyran having the formula:

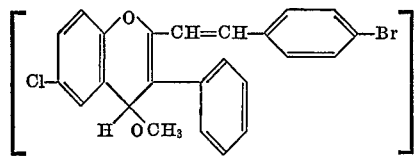

10 g. of 2-p-bromstyryl-3-phenyl-6-chlorobenzopyrylium perchlorate

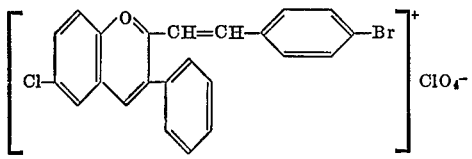

and 15 g. of sodium bicarbonate were added to 50 ml. of methanol and 100 ml. of benzene and the mixture was heated for one hour. The resultant was cooled, filtrated by means of suction, and the filtrate was concentrated under decreased pressure. The residue was dissolved in methanol and was poured into the mixture of crushed ice and water to separate the crystal of a light yellow color. The mixture containing the crystal was put to filtration by means of suction, and was thoroughly washed, and was dried under decreased pressure to obtain the desired crystalline product quantitatively, having the melting point of 80-82° C. As the result of the elemental analysis, the following values were obtained:

theoretical values: H, 3.97%; C, 63.51%; Br, 17.86%; Cl, 7.83%.

experimental values: H, 3.75%; C, 63.32%; Br, 17.60%; Cl, 8.06%.

The measurement made with the product dissolved in dichloroethane showed that the absorption maximum wave length ($\lambda$max.) was 324 m$\mu$ and the molar extinction coefficient $1.57 \times 10^4$.

What is claimed is:
1. A method for the preparation of a decolorized derivative having the formula (I)

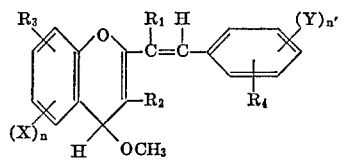

where X and Y are halogen; $R_1$ is hydrogen; $R_2$ is phenyl; $R_3$ and $R_4$ are hydrogen or methoxyl; $n$ and $n'$ are 0, 1 or 2, but at least one of $n$ and $n'$ is not zero; wherein a benzopyrylium salt having the formula (II)

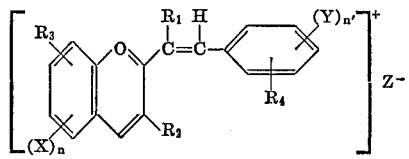

where X, Y, $R_1$, $R_2$, $R_3$, $R_4$, $n$ and $n'$ are the same groups and numbers as X, Y, $R_1$, $R_2$, $R_3$, $R_4$, $n$ and $n'$ in the formula (I); and Z$^-$ is anion functional group; is heated in a mixed solvent of methanol-benzene containing alkali, and the solution is then concentrated and poured into a mixture of crushed ice water to separate the product.

2. A method according to claim 1, wherein said reaction solvent is a mixed solvent comprising 100 parts by volume of methanol containing an alkali and 170 parts by volume to 255 parts by volume of benzene.

3. A method according to claim 1, wherein said alkali contained in the reaction solvent is either sodium hydrogencarbonate or sodium carbonate.

References Cited

C. A. 69: 77057f (1968), Dorofeenko et al.
C. A. 54: 12126e (1960), Kiprianov et al.
Helva Chim Acta 28: 444–445 (1945), Karrer et al.

HENRY R. JILES, Primary Examiner
S. D. WINTERS, Assistant Examiner

U.S. Cl. X.R.

260—600, 465 F, 599, 465 R, 345.2, 621 R; 96—1.6